United States Patent Office 2,771,832
Patented Nov. 27, 1956

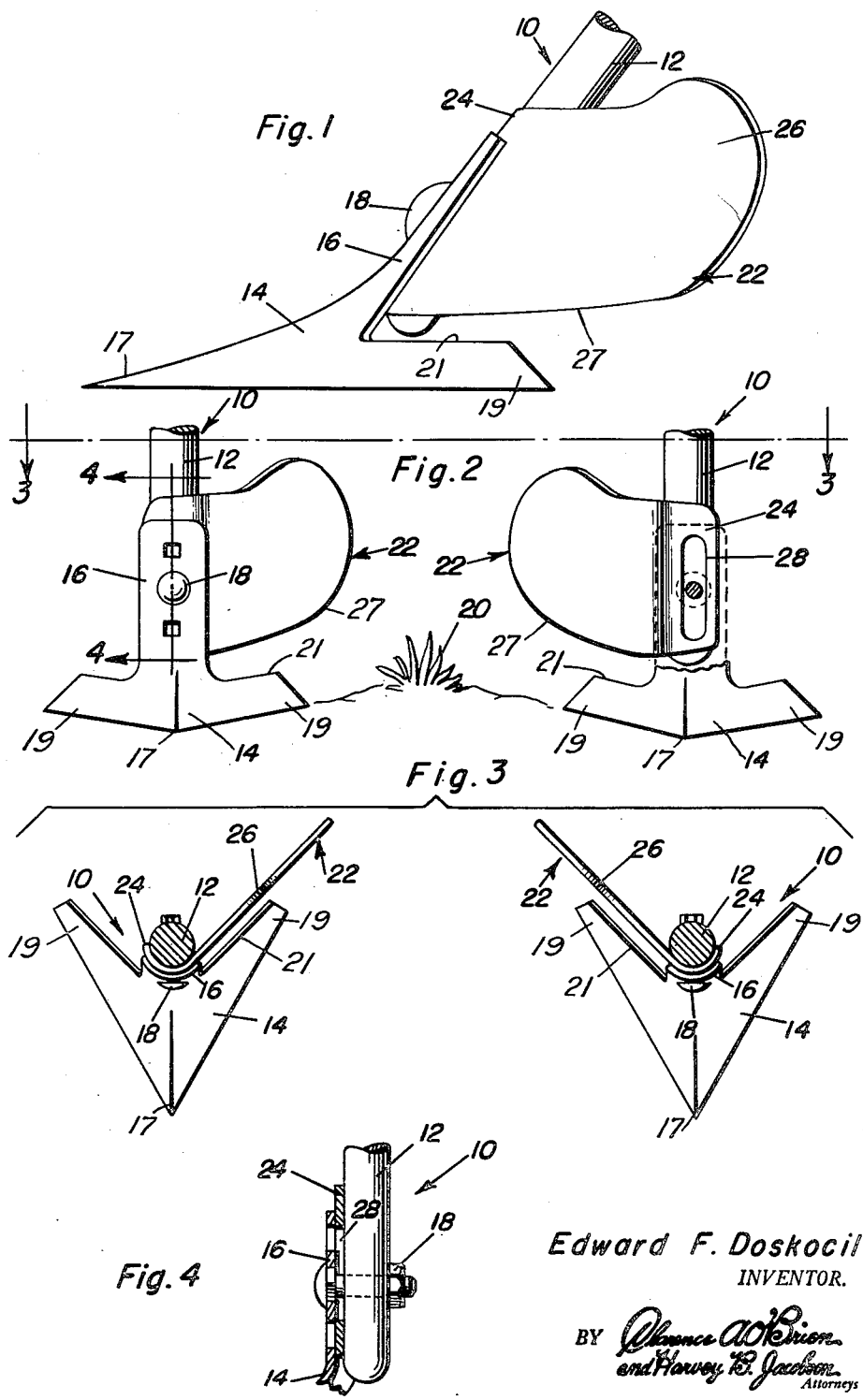

2,771,832

CULTIVATOR ATTACHMENT

Edward F. Doskocil, Burlington, Tex.

Application May 21, 1953, Serial No. 356,544

2 Claims. (Cl. 97—205)

This invention relates in general to improvements in cultivator attachments, and more specifically to a listing attachment for use with a cultivator when cultivating small plants.

In a normal cultivating operation a pair of cultivators are run down alongside a row of plants on opposite sides thereof. Inasmuch as the cultivators are either carried by a tractor or other conveyances, the cultivators must be spaced apart a relatively great distance in order to prevent accidental damaging of the plants of a row being cultivated. Inasmuch as it is necessary to space the cultivators it will be seen that the weeds growing closely adjacent the row of plants will not be removed by the cultivators.

It is therefore the primary object of this invention to provide an improved attachment for cultivators which will cover weeds growing closely adjacent to a row of plants so as to discourage the growth of such weeds.

Another object of this invention is to provide an improved cultivator attachment in the form of a blade secured to a shank of a cultivator above the main portion of an attached shovel, the blade intended to deflect a set amount of earth inwardly towards a row of plants so that earth may be distributed over the weeds growing closely adjacent the plants of a row of plants so as to discourage the growth of such weeds.

Another object of this invention is to provide an improved listing attachment for cultivators in the form of a blade which is readily formed of sheet metal, the blade being readily attachable to a cultivator for use therewith.

Another object of this invention is to provide an improved listing attachment for cultivators in the form of a blade attachable to a shank of a cultivator between the shank and an upper connecting portion of a cultivator shovel carried by the shank, the blade being vertically adjustable with respect to the shank so as to vary the amount of earth being distributed towards the plants in a row of plants.

These together with other objects and advantages which will become subsequently apparent reside in the details of construction and operation as more fully hereinafter described and claimed, reference being had to the accompanying drawings forming a part hereof, wherein like numeral refer to like parts throughout, and in which:

Figure 1 is a side elevational view of the lower portion of a cultivator and shows the same provided with the attachment which is the subject of this invention;

Figure 2 is a front elevational view on a reduced scale of a pair of cultivators provided wtih the attachment which is the subject of this invention and shows the same in operation relative to a row of plants, only the lower portions of the cultivators being shown;

Figure 3 is a transverse sectional view taken substantially upon the plane indicated by the section line 3—3 of Figure 2 and shows the general outline of the blades which form the attachments and shows their relationship to the cultivators, the row of plants being omitted; and Figure 4 is an enlarged fragmentary sectional view taken substantially upon the plane indicated by the section line 4—4 of Figure 2 and shows the relationship of the blade with respect to the shank and shovel of the cultivator.

Referring now to the drawings in detail, it will be seen that there is illustrated a pair of cultivators with each of the cultivators being referred to in general by the reference numeral 10. The cultivators 10 are identical and each cultivator includes a vertically extending shank 12 which is circular in cross section. Secured to the extreme lower end of the shank 12 is a conventional cultivator shovel 14. The cultivator shovel 14 includes an upper attaching portion 16 which normally overlies the front portion of the shank 12 at the lower end thereof, a point 17 and a pair of outwardly and rearwardly extending earth turning members 19 having upper edges 21. The attaching portion 16 is removably secured to the lower end of the shank 12 by a fastener 18 and the turning members 19 are so disposed as to throw earth upward and rearward upon forward motion of the cultivator.

Referring now to Figure 2 in particular, it will be seen that a pair of cultivators 10 are in the process of cultivating a row of plants 20. It will be noted that the shovels 14 of the cultivators 10 are spaced a considerable distance from the row of plants 20 in order to prevent accidental damaging of the individual plants of the row of plants 20 should the tractor or other conveyance to which the cultivators 10 are attached veer from the desired course. Due to the spacing between the shovels 14, weeds growing alongside the row of plants 20 will not be uprooted by the cultivating action. If the growth of such weeds (not shown) is not discouraged the weeds will grow up with the row of plants 20 and stunt the growth of the same.

Accordingly, each of the cultivators 10 is provided with a listing attachment in the form of a blade which is referred to in general by the reference numeral 22. The blade 22 includes a transversely curved forward portion 24 which has formed integrally therewith a rearwardly and outwardly sloping flat portion 26 having a straight lower edge 27. It will be noted that the blade 22 is disposed to the rear and above the upper edge 21 of the turning members 19. Therefore, when the cultivator is in operation the lower edge 27 of the blade 26 is above the upper edge 21 and also above ground level.

It will be seen that when the blades 22 are attached to their respective cultivators 10, the individual blades will face each other. This is due to the forming of the blades 22 in pairs with the blades of each pair including a left-hand blade and a right hand blade, as is best illustrated in Figure 3.

When the cultivators 10 are provided with the blades 22 and are moved through the earth in a cultivating operation, as previously mentioned, earth will be thrown upwardly and rearwardly by turning members 19 of the shovels 14. That earth thrown by the portions of the shovels 14 adjacent a row of plants 20 will have a part thereof strike the blades 22 and the same will be directed inwardly towards the row of plants 20. The blades 22 are of such size that that part of the earth engaging them will be deposited closely adjacent the row of plants 20 and covering the weeds which may be growing adjacent the row of plants. Thus the weeds will be covered and their growth discouraged.

Referring now to Figures 2 and 4 in particular, it will be seen that the curved forward portion 24 of each blade 20 is provided with a vertically extending elongated slot 28. The slot 28 has received therethrough the fastener 18. By providing the blades 22 with vertical slots, such as the slots 28 for the passage of the fasteners 18, it will be seen that the blades 22 may be vertically adjusted with respect to the shanks of the cultivators 10. The vertical adjustment of the blades 22 permits the shovels 14 to penetrate at different depths and also permits the part of the earth raised upwardly by the shovels and engaging the blades 22 to be varied. Thus, it will be seen that the cultivators 10 when provided with the blades 22 may have their depth of penetration varied as well as the amount of earth which will be thrown towards the row of plants 20.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a cultivator, a listing attachment for directing earth adjacent a row of plants being cultivated, said cultivator including a shank having a shovel removably secured to the lower end thereof, said listing attachment being in the form of a blade including a transversely curved forward portion and a flat rearwardly and outwardly extending portion, said shovel including outwardly and rearwardly extending turning members having upper edges, said forward portion being disposed between an upper attaching portion of said shovel and said shank, said blade having a lower edge, said lower edge spaced to the rear and above the upper edge of one of said turning members.

2. The combination of claim 1 wherein said cultivator is mounted in combination with another cultivator, blades of said listing attachment extending inwardly towards each other, said blades being formed in pairs with each pair including a right hand blade and a left hand blade.

References Cited in the file of this patent

UNITED STATES PATENTS

| 41,728 | Swart | Feb. 23, 1864 |
| 391,641 | Peppler et al. | Oct. 23, 1888 |
| 486,492 | McBurnett | Nov. 22, 1892 |
| 653,320 | Sewell | July 10, 1900 |
| 733,761 | Steele | July 14, 1903 |
| 769,055 | Bumgardner | Aug. 30, 1904 |
| 780,405 | Boyle | Jan. 17, 1905 |
| 944,206 | Neufville | Dec. 21, 1909 |
| 989,729 | Swindle | Apr. 18, 1911 |